United States Patent [19]

Maitani et al.

[11] 4,240,735
[45] Dec. 23, 1980

[54] PROTECTIVE COVER FOR TAKING LENS OF CAMERA

[75] Inventors: Yoshihisa Maitani, Hachioji; Toyotaka Yamada, Hino, both of Japan

[73] Assignee: Olympus Optical Co., Ltd., Tokyo, Japan

[21] Appl. No.: 969,776

[22] Filed: Dec. 15, 1978

[30] Foreign Application Priority Data

Jan. 18, 1978 [JP] Japan .................................. 53-3940

[51] Int. Cl.$^3$ ............................................. G03B 17/02
[52] U.S. Cl. ...................................................... 354/288
[58] Field of Search ............... 354/187, 219, 288, 295, 354/354

[56] References Cited

U.S. PATENT DOCUMENTS

| | | | |
|---|---|---|---|
| 3,256,793 | 6/1966 | Denk et al. | 354/288 |
| 3,599,553 | 8/1971 | Hansen | 354/288 |
| 3,611,896 | 10/1971 | Aoki | 354/202 |
| 3,680,455 | 6/1970 | Meinunger | 354/187 |
| 3,732,795 | 5/1973 | Fukuda et al. | 354/288 |
| 3,741,097 | 4/1972 | Fuduka et al. | 354/212 |
| 3,750,549 | 8/1973 | Waaske | 354/286 |
| 3,938,170 | 2/1976 | Winkler | 354/288 |
| 4,096,506 | 6/1978 | Lange | 354/288 |
| 4,132,471 | 1/1979 | Svatek et al. | 354/187 X |

FOREIGN PATENT DOCUMENTS

| | | | |
|---|---|---|---|
| 2803034 | 8/1978 | Fed. Rep. of Germany | 354/288 |
| 49-63426 | 6/1974 | Japan | 354/288 |

OTHER PUBLICATIONS

Minox 110S Catalog, 8/76.
AGFA-GEVAERT Pocket Cameras and Accessories Catalog, 7/75.

Primary Examiner—Richard A. Wintercorn
Assistant Examiner—Thomas H. Tarcza
Attorney, Agent, or Firm—Weinstein & Sutton

[57] ABSTRACT

A protective cover for taking lens of camera comprises a thin sheet which is bent to cover the front, the top and a top portion of the rear of a camera body and is mounted on the camera body so as to be slidable lengthwise thereof between a first position which it covers a taking lens and a second position in which it exposes the lens.

15 Claims, 7 Drawing Figures

PROTECTIVE COVER FOR TAKING LENS OF CAMERA

BACKGROUND OF THE INVENTION

The invention relates to a protective cover for a taking lens (i.e., a picture taking lens) of a camera, and more particularly, to such a protective cover which is slidably mounted on the body of a camera so as to be movable between a first position in which it covers the taking lens and a second position in which it exposes the lens.

As is well recognized, a usual camera which uses a 35 mm wide film roll is provided with a lens cap which is fitted over a lens barrel to cover the taking lens whenever the camera is not used in order to guard the taking lens against the deposition of dusts or fingerprints or other damages. The cap is removed from the camera when it is desired to take a picture, and with the consequent result that it may be lost.

A lens which is incorporated into a finder optical system and which must be protected in the similar manner as the taking lens is left exposed in a usual 35 mm film camera, except for those miniature cameras which are flat and rectangular in configuration, which employs a special, small size film of the cartridge type and which have a case which is slidable relative to the body of the camera so as to cover more than one-half thereof. With a miniature camera having a slidable, lens protecting cover, the case must be laterally moved to expose the taking lens and/or finder lens when taking a picture, thereby resulting in an increased overall size of camera, which becomes as large as twice its original size. Hence, such an arrangement cannot be employed in a usual camera which uses a 35 mm wide film roll. A miniature camera is also known in which the taking lens and/or finder lens is protected by a cover comprising mating halves which open on the hinges. However, the required arrangement is complex, and does not lend itself to use in a usual camera.

It will be seen that the lack of a protective cover for a finder lens such as that used in a rangefinder in a usual camera which employs a 35 mm wide film roll, though the need for its provision has been admitted, is attributable to a prejudice that only a reduced practical utility is obtained for all its complex and expensive arrangement.

SUMMARY OF THE INVENTION

In view of the foregoing, it is an object of the invention to provide a protective cover for a taking lens of a camera which is simply and slidably constructed to cover the front, the top and a portion of the rear of the body of a camera and which can be operated in a simple manner.

In accordance with one embodiment of the invention, the protective cover covers and protects the taking lens and finder lens, and is also capable of covering other elements to be protected such as for example a light impinging window associated with a photometric, light receiving element. In addition, the cover is effective to reliably prevent an inadvertent operation of a film rewind knob during a photographing operation.

The protective cover preferably has a top having an inverted U-configuration and which is fitted over the top of the camera body. The cover includes a depending portion which is adapted to cover the taking lens located on the front side of the camera and which is formed with a guide slot along its lower edge for engagement with a screw having a head which is fixedly mounted on the camera body. Hence, the cover can be simply mounted on the camera after the latter has been assembled.

DESCRIPTION OF PREFERRED EMBODIMENT

Figure 1:
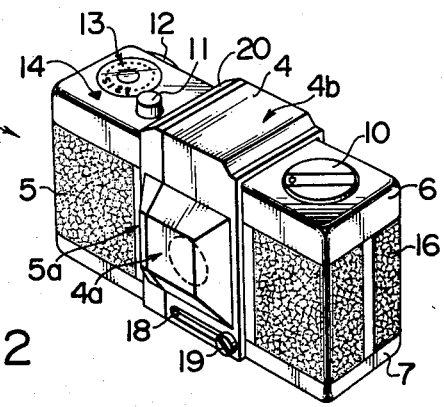
FIG. 1 is a perspective view of the protective cover according to one embodiment of the invention, the cover covering the taking lens of the camera.
Figure 2:
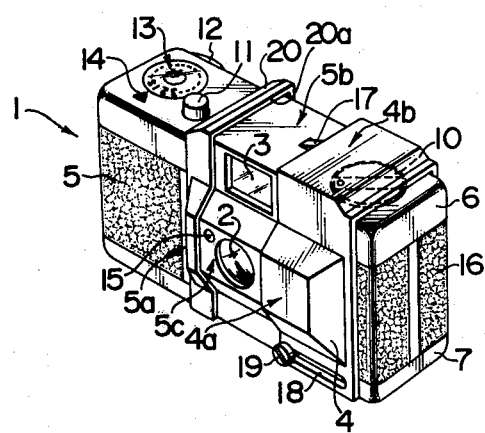
FIG. 2 is a similar perspective view of the protective cover when it is moved to a position in which the taking lens is exposed.
Figure 3:
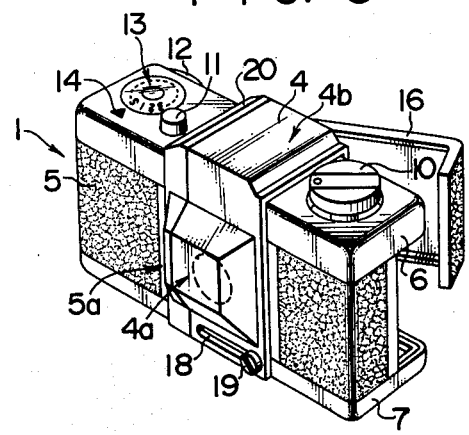
FIG. 3 is a similar perspective view of the camera illustrating that the rear lid of the camera can be opened while the protective cover closes the taking lens.

Referring to FIGS. 1 to 3, there is shown a camera 1 having a body 5 which has its top closed by a lid-like panel 6 that is open in a downward direction and which has its bottom closed by a similar lid-like panel 7 which is open in the upward direction. The overall configuration of the camera represents a rectangle which is elongate in the transverse direction.

This camera represents a usual camera which uses a 35 mm wide film roll and which is adapted to be operated in an automatic exposure mode. The body 5 has a front wall 5a, the central portion of which is raised forwardly and is formed with a central opening 5c (see FIG. 2) in which a taking lens 2 is disposed. A light receiving window 15 (see FIG. 2) which is used for the purpose of photometry is formed in the upper, left-portion of the wall 5a. The body 5 also includes a top wall 5b, the central portion of which is also raised upwardly, with an objective lens 3 and an eyepiece 3a (see FIG. 4) of a finder optical system being disposed below this wall.

A film rewind knob 10 is disposed in the right-hand portion of the top panel 6 while a shutter release button 11 and a sight window 13 associated with a film frame counter having an index 14 associated therewith are disposed on the left-hand portion thereof. It is to be noted that a film winding knob 12 is disposed on the back wall of the top panel 6 adjacent to its left end.

Camera includes a rear lid 16 which is hinged to the left-hand side of the body 5 so as to be movable relative to the camera 1. As shown in FIG. 3, when film rewind knob 10 is pulled upwardly, the lid is unlocked and can be opened.

A frame 20 is secured to the body 5 in its central region, at a position offset to the left, for abutment against one end face of a protective cover 4 of the invention, to be described later, when the latter assumes a position to cover the taking lens 2. The frame 20 comprises a thin sheet which is folded to extend along the front, the top and the rear surface of the camera so that its right-hand end face, as viewed in FIG. 2, is located adjacent to the raised portion of the front wall 5a, the raised portion of the top wall 5b and outside the eyepiece 3a which is mounted on the rear side of the camera adjacent to the top surface thereof.

In accordance with the invention, the protective cover 4 comprises a thin sheet which is bent to define a front plate 4a, top plate 4b and rear plate 4c (see FIG. 4) which extend respectively along the front, the top and an upper portion of the rear of the camera 1, inclusive of the front wall 5a of the body 5 and the central raised portion of the top wall 5b. In this manner, the protective cover 4 is designed to cover the exterior of the lenses 2, 3 and 3a. The cover 4 has a lateral width which prevents a projection thereof laterally beyond the extremity of the camera 1 when it has moved to a position shown in FIG. 2 in which the lenses 2, 3, 3a and window 15 are exposed.

Figure 4:
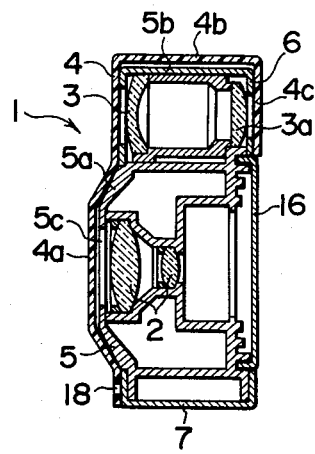
FIG. 4 is a longitudinal section of the protective cover shown in FIG. 1.

As shown in FIG. 4, the protective cover 4 is mounted on the camera 1 by abutting the inner surface of a top portion of the front plate 4a and the inner surface of the rear plate 4c of the cover 4 against the front and rear of the camera, respectively, so that the inner faces of the front and rear plates 4a, 4c can be slidably moved lengthwise of the camera 1 along the front and rear surfaces thereof. In its lower edge, the front plate 4a is formed with a guide slot 18 extending lengthwise of the camera 1 and which is fitted with a headed bolt 19 which is threadably engaged with the bottom portion of the front wall 5a of the body 5. In this manner, the extent of movement of the protective cover 4 between the positions shown in FIGS. 1 and 2 is limited. The head of the bolt 19 prevents the lower portion of the front plate 4a of the cover 4 from being curled or displaced forwardly.

Thus it will be seen that the protective cover 4 is slidably mounted on the camera 1 so as to be movable lengthwise thereof between a first position shown in FIG. 1 in which it completely covers the lenses 2, 3, 3a and window 15 and a second position shown in FIG. 2 in which these lenses and window are fully exposed. In the position shown in FIG. 2, the cover does not project laterally beyond the right-hand end of the camera 1, and also covers the substantial portion of the film rewind knob 10. This prevents an inadvertent opening of the rear lid when the cover 4 is in its open position. It will be appreciated that such precaution means is effective with a type of camera in which the rear lid is opened by raising the rewind knob 10 upward.

Figure 5A:
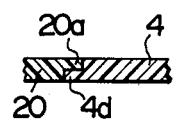
FIGS. 5(A) and (B) are fragmentary, enlarged cross sections of the protective cover, illustrating alternative abutting end faces.
Figure 5B:
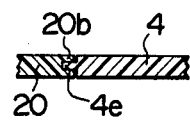

As shown in FIG. 5(A), the left-hand end face of the protective cover 4 and the corresponding right-hand end face of the frame 20 are formed with steps 4d, 20a, respectively, which are engageable with each other. When the protective cover 4 is in its closed position, the left-hand end face thereof bears against the right-hand end face of the frame 20 to engage the steps 4d, 20a with each other, thus preventing an ingress of dusts from the exterior. As an alternative arrangement, the steps 4d, 20a may comprise a dovetail key 4e and a dovetail groove 20b, respectively, as shown in FIG. 5(B). This ensures a positive fitting engagement therebetween.

Figure 6:
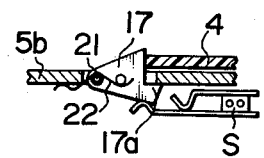
FIG. 6 is an enlarged front view of a stop member associated with the protective cover.

When the protective cover 4 has moved to the position in FIG. 2 to expose the lenses and the window, a return movement thereof is blocked by the abutment of its left-hand end face against a stop member 17 which pops up through an opening formed in the top wall 5b of the body 5, as shown in FIG. 6. The stop member 17 comprises a rocking member which is pivotally mounted on a pin 21 secured to the top wall 5b and which is biased to move upwardly through the top wall 5b, by a torsion spring 22 disposed on the pin 21. When the cover 4 is moved to its open position, the bias of the spring 22 is effective to rotate the stop member 17 counter-clockwise about the pin 21 to cause it to pop upwardly above the top wall 5b, thus causing it to abut against the left-hand end face of the cover 4. The member 17 is formed with a step 17a which bears against the inner surface of the top wall 5b to limit its angular movement.

The stop member 17 also functions to operate a power switch S connected in an electrical circuit such as an exposure meter circuit of the camera when it pops up through the top wall 5b. When the cover 4 is closed, the stop member 17 is urged inward by the protective cover, thus opening the switch S.

While not shown, the top plate 4b of the cover 4 is internally formed with a slot (not shown) to engage the stop member 17 when the cover 4 is moved to the position shown in FIG. 1, thus maintaining the cover in its closed position.

When the protective cover 4 is returned to the closed position, the stop member 17 may be manually depressed to permit a sliding movement of the cover 4 to its position closing the taking lens 2, whereupon the taking lens 2, objective lens 3, eyepiece 3a and window 15 are completely covered and guarded against an external influence and also against the ingress of dusts. Conversely, when the protective cover 4 is moved lengthwise of the camera 1 to the position of FIG. 2, it is maintained open by the engagement of its left-hand end face against the stop member 17, fully exposing the lenses 2, 3, 3a and window 15 to permit a photographing operation while simultaneously covering the film rewind knob 10.

What is claimed is:

1. A camera comprising:
   a camera body including spaced front and rear surfaces separated by top and bottom surfaces and lateral end surfaces, the lateral end surfaces being spaced to define a predetermined lateral dimension of said camera body;
   a picture taking lens disposed in said front surface of said camera body;
   a finder optical system including an objective lens and an eyepiece respectively disposed in said camera body;
   a loading cover for loading and unloading film in said camera body, said loading cover being disposed in said rear surface of said camera body;
   a protective cover member separate from said camera body and including first and second spaced portions which extend at least partially along said front and rear surfaces of said camera body respectively;
   mounting means for slidably mounting said protective cover member for lateral movement on the exterior of said camera body so that said cover member is laterally slidably movable between a first position in which said protective cover member covers said picture taking lens, said objective lens, and said eyepiece, and in which said second portion of said protective cover member is spaced from said loading cover to completely expose said loading cover, and a second position in which said picture taking lens, said objective lens and said eyepiece are exposed, said protective cover member being adapted to lie within the lateral extent of said predetermined lateral dimension of said camera body when said cover member is in said first and second positions.

2. The camera of claim 1 wherein said first and second spaced portions of said cover member are integrally joined to a top portion of said cover member which extends along said top surface of said camera body to be slidable laterally therealong between said first and second portions.

3. The camera of claim 2 wherein said mounting means includes guide means for permitting only lateral movement of said cover member along said front and rear surfaces of said camera body, and for preventing displacement of said cover member forwardly away from said camera body.

4. The camera of claim 3 wherein said guide means comprises a lateral extending guide slot formed in said first portion of said cover member and a headed bolt secured to said front surface of said camera for fitting engagement with said guide slot, the head of said bolt being larger than the width of said guide slot.

5. The camera of claim 1 further including a photometric light impinging window disposed in said camera body and wherein said cover member includes a portion covering said photometric light impinging window when said cover member is in said first position.

6. The camera of claim 1 wherein the lateral dimension of said protective cover member is less than the distance said cover member moves between said first and second position.

7. The camera of claim 6 wherein said mounting means includes means for preventing said cover member from laterally projecting beyond the lateral extent of said camera body.

8. A camera comprising:
a camera body having a predetermined lateral dimension;
a lens mounted in said camera body;
a film rewind member mounted on said camera body, said film rewind member being operable to rewind the film in said camera body;
a protective cover member separate from said camera body for said lens and said film rewind member;
mounting means for slidably mounting said protective cover member for lateral movement on the exterior of said camera body so that said cover member is laterally slidably movable between a first position in which said cover member covers said lens and a second position in which said lens is exposed, said cover member also including a portion for disabling operation of said film rewind member when said cover member is in said second position, and said cover member being adapted to lie within the lateral extent of said predetermined lateral dimension of said camera body when said cover member is in said first and second positions.

9. A camera comprising:
a camera body having a predetermined lateral dimension;
a lens mounted in said camera body;
an electrical circuit for said camera body including a power switch adapted to be closed to activate said electrical circuit and to be opened to deactivate said electrical circuit;
a protective cover member for said lens separate from said camera body;
mounting means for slidably mounting said protective cover member for lateral movement on the exterior of said camera body so that said cover member is laterally slidably movable between a first position in which said cover member covers said lens and a second position in which said lens is exposed, said cover member being adapted to lie within the lateral extent of said predetermined lateral dimension of said camera body when said cover member is in said first and second positions;
a releasable stop member movable between an abutting position in which said stop member is in abutting relationship with respect to said cover member when said cover member is in said second position to prevent movement of said cover member towards said first position and a non-abutting position in which said cover member is free to move from said second position to said first position;
a spring for biasing said stop member towards said abutting position so that when said cover member is moved into said second position said stop member is moved into said abutting position; and
means for closing said power switch when said stop member is in said abutting position and for opening said power switch when said stop member is in said non-abutting position.

10. The camera of claim 1 wherein said picture taking lens is projected from said front surface of said camera body and wherein said first portion of said protective cover member includes a recessed portion for fitting over said projected picture taking lens when said protective cover member is in said first position.

11. The camera of claim 1 wherein said eyepiece of said finder optical system is disposed in said rear surface of said camera body above said loading cover and wherein said second portion of said protective cover member extends vertically along said rear surface only to an extent to completely cover said eyepiece when said protective cover member is in said first position.

12. The camera of claim 8 further including a loading cover disposed in said camera body for loading and unloading film in said camera body, said loading cover including a lock mechanism for locking said cover member in a closed position, and wherein said film rewind member is associated with said locking mechanism to release said locking mechanism only when said film rewind member is moved in a direction away from said camera body, and wherein said portion of said protective cover member for disabling operation of said film rewind member prevents movement of said film rewind member in a direction away from said camera body when said protective cover member is in said second position so that said loading cover is prevented from being opened when said protective cover member is in said second position.

13. A camera comprising:
a camera body including spaced front and rear surfaces separated by top and bottom surfaces and lateral end surfaces;
a picture-taking lens disposed in said front surface of said camera body;
a finder-optical system including an objective lens and an eyepiece, each respectively disposed in said camera body;
a loading cover for loading and unloading film in said camera body, said loading cover being disposed in said rear surface of said camera body;
a protective cover member including first and second spaced-apart sections which cover a portion of said front and rear surfaces of said camera body, respectively;

mounting means for slidably mounting said protective cover member for lateral movement on the exterior of said camera body so that said cover member is slidably movable between a first position in which said protective cover member covers said picture-taking lens, said objective lens, and said eyepiece, and a second position in which said picture-taking lens, said objective lens, and said eyepiece are exposed; and said front surface of said camera body including a section uncovered by said protective cover when said protective cover is in said first position, said uncovered section being covered by said protective cover when said protective cover is moved to said second position.

14. A camera in accordance with claim 13 wherein the lateral end surfaces of said camera body are spaced to define a predetermined lateral dimension of said camera body, said protective cover member being adapted to lie within the lateral extent of said predetermined lateral dimension of said camera body when said cover member is in said first or second position.

15. A camera in accordance with claim 13 wherein said second section of said protective cover member is spaced from said loading cover to completely expose said loading cover when said protective cover member is in said first position.

* * * * *